Figure 1:
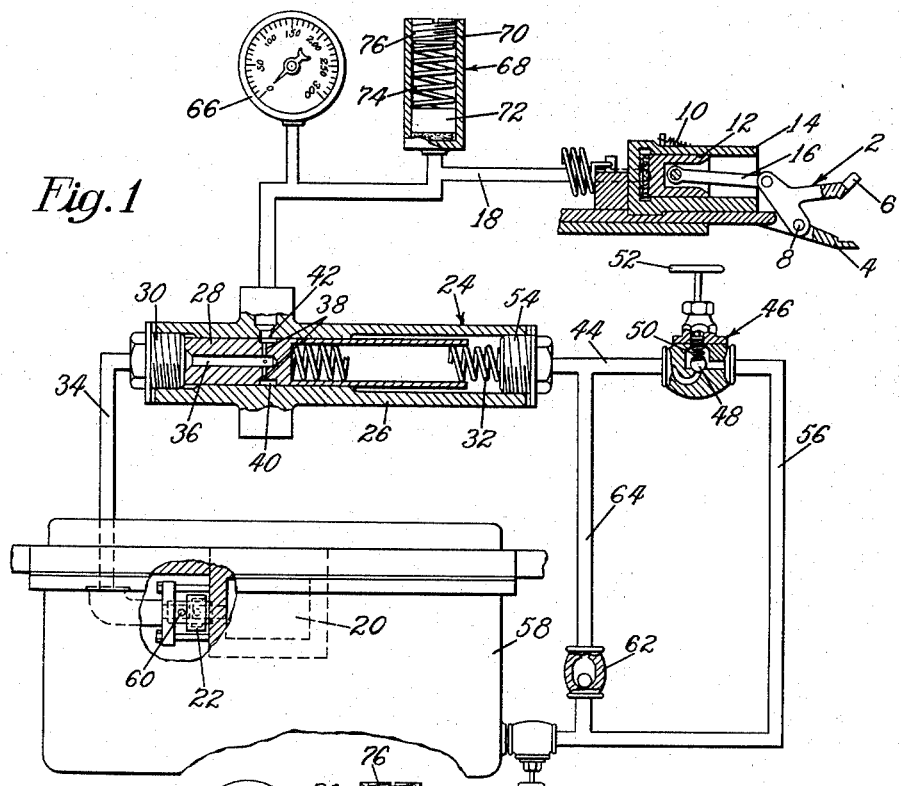

Oct. 17, 1950     B. JORGENSEN     2,525,908

FLUID PRESSURE MECHANISM

Original Filed April 24, 1943

*Inventor*
Bernhardt Jorgensen
By his Attorney

Patented Oct. 17, 1950

2,525,908

UNITED STATES PATENT OFFICE 2,525,908

FLUID-PRESSURE MECHANISM

Bernhardt Jorgensen, Marblehead, Mass., assignor to United Shoe Machinery Corporation, Flemington, N. J., a corporation of New Jersey Original application April 24, 1943, Serial No. 484,327. Divided and this application March 23, 1944, Serial No. 527,752

3 Claims. (Cl. 137—153)

This invention relates to fluid-pressure mechanism, and is herein illustrated as embodied in means for controlling the pressure of fluid for operating motor devices, the present application being a division of a copending application for Letters Patent for Improvements in Lasting Machines, Serial No. 484,327, filed on April 24, 1943, on which Letters Patent No. 2,377,887 were granted on June 12, 1945.

The machine shown in the above-mentioned application is provided with a plurality of mechanisms which are operated automatically in predetermined time relation to one another by fluid admitted thereto from a source of supply comprising a chamber in which fluid is maintained under pressure by a continuously running pump. Included among these mechanisms are a plurality of grippers which grip the margin of the shoe upper to control the upper in the lasting operation, each gripper including a pair of uppergripping jaws and a motor device operated by the fluid under pressure to effect relative closing movement of the jaws. For reasons explained in the above-mentioned application it is desirable that the force with which the upper is gripped by the jaws shall be accurately predetermined and shall be maintained constant after the jaws have closed, regardless of any fluctuations in the pressure of the operating fluid at the source of supply, and that this force may be adjustably varied in accordance with the requirements of different upper materials.

In view of the above and other considerations, the present invention provides a novel organization of fluid-pressure mechanism having means for controlling the pressure of fluid acting, for example, on a motor device, whether such a device be associated with gripper jaws or with other means to which power is applied. In the construction herein shown the flow of fluid to the motor device is controlled by a cut-off member which is movable against the resistance of a return spring by the pressure of the fluid at the source of supply to cut off the flow and to trap the fluid in the motor device when the pressure of the fluid therein reaches a predetermined maximum less than the pressure at the source. The cut-off member, herein shown as a piston, is thus movable to a position well beyond the position where it first cuts off the flow, which latter may be termed its cut-off position, so as to hold the fluid trapped in the motor device regardless of such fluctuations in the pressure of the fluid at the source as may be due to the admission of fluid to other mechanisms operated thereby. To facilitate such control of the fluid by the cut-off member, the construction shown is further such that there is but little increase in the resistance to movement of the member after it starts to move, the initial resistance to its movement being greater than the force tending later to return it. Such return of the member, when permitted, is effected only by the above-mentioned spring which is comparatively light, but movement of the member to cut-off position is resisted not only by this spring but by fluid-pressure means which prevents such movement of the member until the desired pressure in the motor device is attained. This fluid-pressure means comprises a body of liquid acting on the member and controlled by a relief valve which opens against the resistance of a spring only upon the attainment of the desired pressure in the motor device, this spring being adjustable to vary the pressure thus attained. When the relief valve opens the cut-off member is moved quickly by the pressure of the fluid at the source of supply to cut off the flow to the motor device and is further moved to a position well beyond that where it first cuts off the flow, since in its movement it encounters no increase in resistance other than that due to compression of the comparatively light return spring. To afford better insurance that the pressure of the fluid thus trapped in the motor device will be maintained constant, the construction shown further includes an accumulator which is in communication with the motor device and is charged when the fluid is delivered to that device.

The novel features of the invention will now be more particularly described with reference to the accompanying drawings and thereafter pointed out in the claims.

Figure 2:
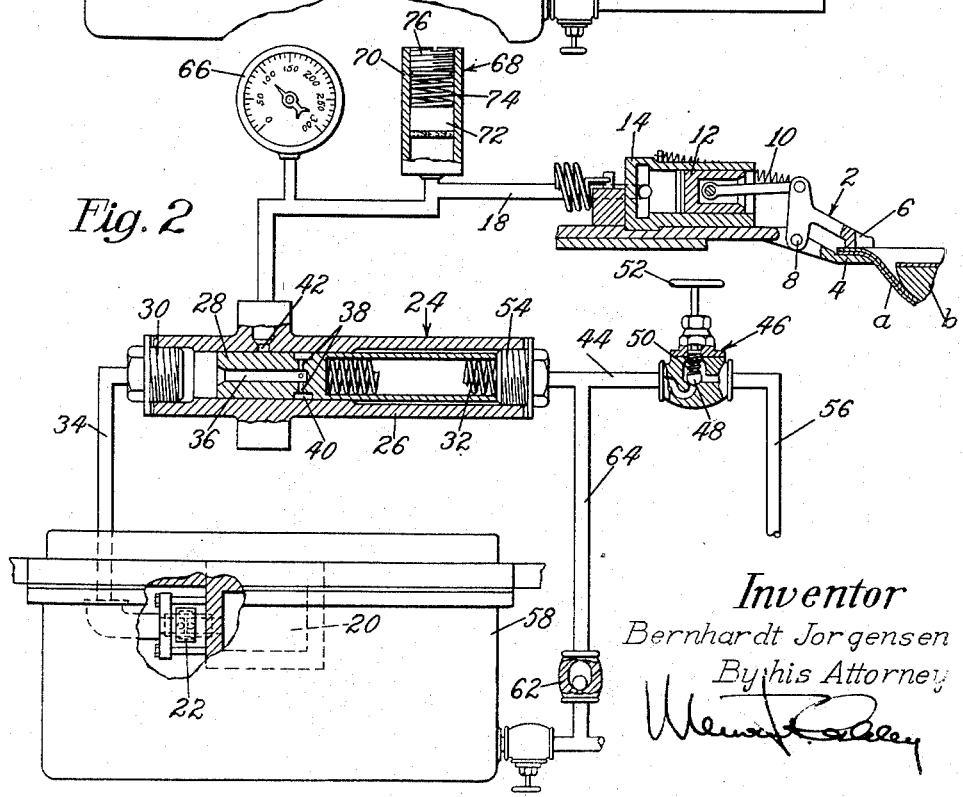

In the drawings,

Fig. 1 is a partly diagrammatic view of the illustrative embodiment of the invention shown in the previously mentioned application, with the operating parts in their initial positions; and Fig. 2 is a view similar to Fig. 1, but showing the parts in their operating positions.

One of the grippers shown in the above-mentioned application is designated generally herein by the reference character 2. It includes a lower jaw 4 and an upper jaw 6 pivoted at 8 on the lower jaw for swinging movement toward the latter into position to grip the margin of an upper $a$ (Fig. 2) mounted on a last $b$ for the purpose of applying a pull to the upper and of controlling it in the lasting operation. Such swinging movement is imparted to the jaw 6 against the resistance of a return spring 10 by a fluid-operated piston 12 mounted in a cylinder 14 and connected to the jaw 6 by a link 16, the cylinder and piston constituting a motor device which may be termed also a fluid receiver. Fluid, preferably light oil, for operating the piston 12 is conducted to the cylinder 14 through a pipe line 18. This fluid comes from a chamber or manifold 20 which serves as a source of supply of fluid under pressure for operating various mechanisms with which the machine is provided. The fluid is delivered to the chamber 20 by a continuously operating pump (not shown), the normal pressure of the fluid in the chamber being determined by a relief valve (also not shown). A full disclosure of this fluid-pressure system, applied to a machine of the same general character as shown in the above-mentioned application, will be found in United States Letters Patent No. 2,324,509, granted on July 20, 1943, on an application of mine. For admitting fluid to the cylinder 14 and for releasing the fluid therefrom there is provided a sleeve valve 22 which controls communication between the chamber 20 and the pipe line 18 and which corresponds to the valve 165 shown in the above-mentioned Letters Patent. This valve is moved into position thus to admit the fluid, which may be termed its open position, and is maintained in that position until it is desired that the gripper shall release the upper.

For purposes of this invention there is interposed between the valve 22 and the pipe line 18 a pressure-controlling valve designated generally by the reference character 24. This valve serves as means for definitely reducing the pressure of the fluid supplied to the cylinder 14 below the pressure of the fluid in the chamber 20. It comprises a cylinder 26 and a piston 28 movable in the cylinder. This piston is held initially in engagement with a plug 30 at one end of the cylinder by a spring 32, and fluid is conducted into that end of the cylinder from the valve 22 through a pipe 34. Fluid thus admitted to the cylinder 26 passes through a bore 36 in the piston 28 and through ports 38 to an annular chamber 40 formed in the piston, and from this chamber it passes through a port 42 in the cylinder 26 to the pipe line 18. It will be understood that the fluid thus admitted to the cylinder 14 first moves the piston 12 to swing the gripper jaw 6 into position to grip the upper against the jaw 4 and then serves to increase the pressure of the jaws on the upper. At the same time the fluid from the source of supply tends by its pressure on the valve piston 28 to move this piston along the cylinder 26 against the resistance of the spring 32. Such movement of the piston 28, however, does not take place until the pressure of the fluid in the cylinder 14 has been built up to a predetermined maximum. This maximum pressure is determined, in the construction shown, not only by the spring 32, which is a comparatively light spring, but also by additional means arranged to control the movement of the piston 28. For the purpose of such additional control that portion of the cylinder 26 in which the spring 32 is mounted provides a chamber which is filled with fluid, i. e., with oil, and is in communication through a pipe 44 with a relief valve 46. This relief valve comprises a ball-shaped valve member 48 normally held on its seat to prevent escape of fluid from the pipe 44 by a spring 50 which is adjustably compressible by a hand wheel 52. No movement of the valve piston 28, therefore, occurs until the pressure of the fluid acting on the piston is sufficient to overcome the combined resistances of the springs 32 and 50. As soon as this pressure is great enough to force the valve member 48 from its seat the piston 28 is moved quickly along the valve cylinder 26 against the resistance of the spring 32 to close the port 42, thus acting as a cut-off member to prevent further increase of pressure in the cylinder 14 and to trap the fluid in this cylinder. It will be evident that in this movement the piston encounters no increase of resistance other than that due to compression of the comparatively light spring 32. By the pressure of the fluid from the supply chamber 20 the piston 28 may thus be moved until it is stopped by engagement with a plug 54 in one end of the valve cylinder 26, at which time the annular chamber 40 in the piston is located a substantial distance beyond the port 42 (Fig. 2). Accordingly, any such drop in the pressure of the fluid in the supply chamber 20 as may occur momentarily by reason of admission of fluid therefrom to some one of the other operating mechanisms of the machine while the gripper 2 is closed on the upper will not result in such return movement of the valve piston 28, under the influence of the light spring 32 alone, as to bring the annular chamber 40 again into registration with the port 42. The pressure with which the gripper is held closed on the upper will therefore not be affected by any such fluctuation of pressure at the source of fluid supply.

The fluid which escapes past the relief valve member 48 when this member is forced from its seat is conducted by a pipe 56 to a reservoir 58 from which fluid is delivered to the pressure chamber 20 by the previously mentioned pump. When the valve 22 is returned to its initial position it uncovers a port 60 (Fig. 1) through which fluid is permitted to escape from the pipe 34 to the reservoir 58. As a result the valve piston 28 is quickly returned to its initial position by the spring 32, forcing the fluid ahead of it out through the port 60. The annular chamber 40 in the piston is thus returned into position to register with the port 42, thereby releasing the fluid in the pipe line 18 and the cylinder 14 and permitting the piston 12 to be returned by the spring 10 to release the upper from the gripper. When the valve piston 28 is returned by the spring 32 fluid is permitted to flow freely from the reservoir 58 into that end of the cylinder 26 where the spring 32 is located through a check valve 62 and a by-pass pipe 64 leading from the pipe 56 to the pipe 44. It will be understood that by adjusting the valve spring 50 by means of the hand wheel 52 the operator may vary, as desired, the force necessary to unseat the valve member 48 and therefore the force with which the upper is gripped by the gripper jaws. The amount of such force is shown by an indicator 66 connected to the pipe line 18.

To afford better insurance that the pressure of the fluid trapped in the cylinder 14 by the valve piston 28 will remain substantially constant regardless of any possible leakage or other condition tending to reduce the pressure, there is further provided an accumulator 68 which comprises a cylinder 70 in communication at one end with the pipe line 18 and having therein a piston 72 movable against the resistance of a spring 74 which is seated against a plug 76 threaded in the other end of the cylinder. It will be understood that by the pressure of the fluid in the pipe line 18 the piston 72 is moved against the resistance of the spring 74, a suitable vent being provided above the piston, and this spring serves thereafter to maintain the gripper-closing pressure substantially constant regardless of any condition tending to result in a reduction of the pressure while the upper is held gripped.

Having described the invention, what I claim as new and desire to secure by Letters Patent of the United States is:

1. In fluid-pressure mechanism, controlling means adapted to be interposed between a source of fluid under pressure and an outlet conduit to control the flow of fluid from said source to the conduit, said controlling means comprising a valve member movable in the direction of the flow of the fluid by the pressure of the fluid at the source to interrupt the flow and thereby to limit the pressure of the fluid in the conduit, spring means for yieldingly resisting such movement of the valve member and for later returning it, and additional means for preventing the movement of said valve member until the pressure thereon becomes more than sufficient to overcome the force of said spring means and for then releasing it, said member being movable when thus released beyond the position where it first interrupts the flow of the fluid while still preventing such flow thereby to maintain the pressure of fluid in the outlet conduit during fluctuations in the pressure of the fluid at the source.

2. In fluid-pressure mechanism, controlling means adapted to be interposed between a source of fluid under pressure and an outlet conduit to control the flow of fluid from said source to the conduit, said controlling means comprising a valve member movable in the direction of the flow of the fluid by the pressure of the fluid at the source to interrupt the flow and thereby to limit the pressure of the fluid in the conduit, spring means for yieldingly resisting such movement of the valve member and for later returning it, additional means comprising an enclosed body of liquid arranged to act on said member to prevent its movement initially by the pressure thereon, and a relief valve arranged to permit escape of the liquid and thus to release said valve member only when the pressure on the member becomes more than sufficient to overcome the force of said spring means, said valve member being movable when thus released beyond the position where it first interrupts the flow of the fluid while still preventing such flow thereby to maintain the pressure of fluid in the outlet conduit during fluctuations in the pressure of the fluid at the source.

3. In fluid-pressure mechanism, controlling means adapted to be interposed between a source of fluid under pressure and an outlet conduit to control the flow of fluid from said source to the conduit, said controlling means comprising a cylinder adapted to communicate at one end with said source and having in its side a port through which the fluid may be conducted to the conduit, a piston in the cylinder having therein a passageway affording communication between that end of the cylinder and said port to permit the flow of the fluid when the piston is in its initial position, the piston being movable by the pressure of the fluid thereon to close said port and thereby limit pressure of fluid in the conduit, said piston being further movable in the same direction by said pressure while still maintaining the port closed thereby to maintain the pressure of the fluid in the outlet conduit during fluctuations in the pressure of the fluid at the source, spring means for yieldingly resisting such movement of the piston and for later returning it, the cylinder having in its other end a body of liquid for initially preventing the movement of the piston, and a relief valve arranged to permit escape of the liquid and thus to release the piston for movement only when the pressure of the fluid thereon becomes more than sufficient to overcome the force of said spring means.

BERNHARDT JORGENSEN.

REFERENCES CITED

The following references are of record in the file of this patent:

UNITED STATES PATENTS

| Number | Name | Date |
|---|---|---|
| 452,742 | Welch | May 19, 1891 |
| 1,201,237 | Ashton | Oct. 17, 1916 |
| 1,770,912 | Clapp | July 22, 1930 |
| 1,847,073 | Ernst | Mar. 1, 1932 |
| 1,907,162 | Webb | May 2, 1933 |
| 2,167,328 | Beggs | July 25, 1939 |
| 2,273,111 | Kindl | Feb. 17, 1942 |
| 2,308,712 | Peterson | Jan. 19, 1943 |
| 2,337,573 | Schultz | Dec. 28, 1943 |
| 2,351,047 | Hughes | June 13, 1944 |

FOREIGN PATENTS

| Number | Country | Date |
|---|---|---|
| 13,595 | Great Britain | May 26, 1904 |
| 462,487 | France | of 1913 |